United States Patent [19]
Gardner

[11] 3,731,205
[45] May 1, 1973

[54] SEQUENCE DETECTOR CIRCUIT
[75] Inventor: Edward Boyd Gardner, Bloomfield, Conn.
[73] Assignee: Emhart Corporation, Bloomfield, Conn.
[22] Filed: Mar. 23, 1972
[21] Appl. No.: 237,367

[52] U.S. Cl....................328/5, 250/223 B, 307/215, 307/232, 307/247, 307/262, 328/109
[51] Int. Cl.........................G01n 27/00, G08b 13/16
[58] Field of Search..................250/223 R, 223 B; 307/215, 231, 232, 247, 262, 308, 311; 328/5, 109

[56] References Cited

UNITED STATES PATENTS

| | | | |
|---|---|---|---|
| 3,265,901 | 8/1966 | Schneider | 250/223 B |
| 3,365,699 | 1/1968 | Foster | 250/223 B |
| 3,549,890 | 12/1970 | Keller | 250/223 B X |
| 3,641,569 | 2/1972 | Bushnell et al. | 34/38 L |

Primary Examiner—Stanley D. Miller, Jr.
Attorney—John C. Hilton

[57] ABSTRACT

First and second longitudinally spaced photocell transducers are provided alongside a conveyor upon which articles are fed in sequence past these photocells, the spacing of the photocells being such that each is adapted to be located just inside the leading and trailing edges respectively of an article on the conveyor, each photocell is adapted to be activated in response to passage of the articles on the conveyor. Electric circuit means of the solid state type is adapted to accept sequential output signals from the photocells and to generate an output (OUT) pulse when the sequential photocell outputs bear a predetermined phase relationship to one another.

3 Claims, 4 Drawing Figures

SEQUENCE DETECTOR CIRCUIT

SUMMARY OF THE INVENTION

This invention relates to logic circuits for determining whether a correct sequence of two functions is encountered, and deals more particularly with a solid state circuit adapted to receive signals from conventional photocells, or other transducers and through a series of NAND gates to generate an output pulse indicative of the phase relationship between the photocell transducer outputs.

DETAIL DESCRIPTION

Figure 1:
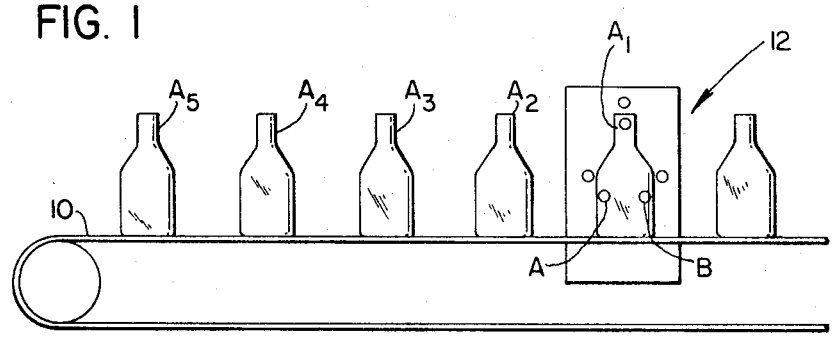
FIG. 1 is a schematic view of a conveyor which is adapted to move a series of articles through an inspection station, which station comprises a plurality of spaced photocells adapted to be activated in timed relationship to one another and to indicate the girth and or the height of an article undergoing inspection.

Turning now to the drawings in greater detail, FIG. 1 shows a conventional conveyor 10 which conveyor is adapted to advance a series of articles $A_1$ through $A_5$ inclusively past an inspection station indicated general at 12. The inspection station may comprise a single array of photocells located in a predetermined pattern for detecting certain geometric features of the articles as they are fed through the inspection station on the conveyor 10. Two of the photocells indicated generally by the reference letters A and B will be discussed in greater detail hereinbelow, and the other photocells are shown by way of example only. For example, the photocells A and B are shown to be spaced longitudinally of the conveyor so as to be both covered when an article $A_1$ is larger than some predetermined diameter or girth. The photocells located immediately thereabove are adapted to be uncovered when the articles is so arranged, indicating that the article is less than some predetermined diameter or girth. Finally, the remaining photocells located one above and one slightly below the upper end or neck portion of the article are so arranged as to provide useful information on the height of the article.

Figure 2:
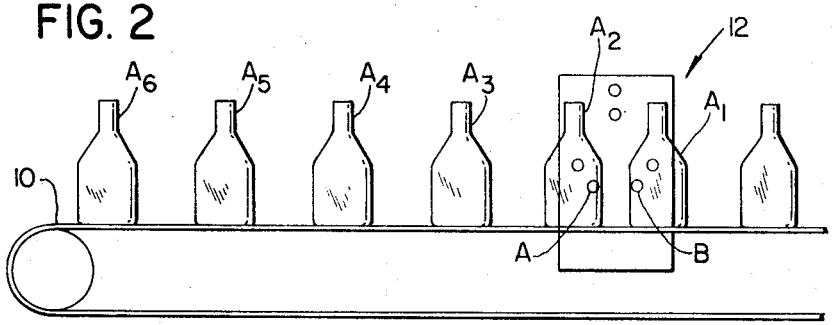
FIG. 2 is a view similar to FIG. 1 but taken at a slightly later instant of time.

FIG. 2 shows the same arrangement of conveyor and inspection station as depicted in FIG. 1, but with the articles $A_1$ through $A_6$ shown at a slightly later instant of time wherein the articles $A_1$ and $A_2$ happen to cover photocells A and B, but which covering happens to be incidential and due only to the spacing of the articles on the conveyor rather than to the fact that an article should be inspected at this point in time. FIG. 2 illustrates a condition which must not be utilized for triggering the circuitry associated with the inspection station 12, and it is an important feature of the present invention that the circuitry to be described with reference to FIG. 4 does provide a very useful output pulse (OUT) whenever the condition shown in FIG. 1 obtains, but which circuitry will fail to provide such an output signal when the condition shown in FIG. 2 occurs.

Figure 3:
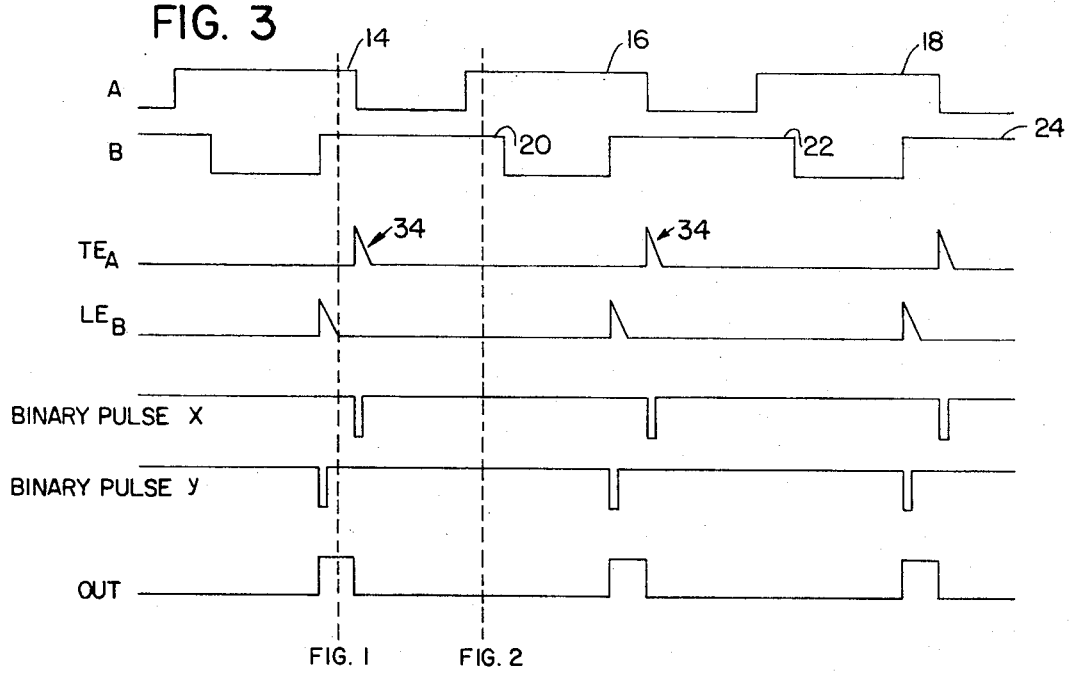
FIG. 3 is a schematic representation of the outputs of two of the photocells shown in FIGS. 1 and 2, together with the pulses and other signals associated with the circuitry of FIG. 4.

As shown in FIG. 3, photocell A is adapted to provide a series of output signals 14, 16 and 18 when the articles $A_1$, $A_2$ and $A_3$ are conveyed past it. The duration of each of the signals 14, 16 and 18 will depend on the diameter or girth of the article undergoing inspection, and of course upon the speed of the conveyor 10. The second line in FIG. 3 shows the same configuration for a second series of output signals which occur as the photocell B is sequentially covered and uncovered as a result of passage of the articles $A_1$, $A_2$ and $A_3$. The output signals of photocells A and B are shown as they would occur in timed relationship to one another given the conditions referred to above, namely the diameter of the articles being inspected together with the speed of the conveyor 10.

Figure 4:
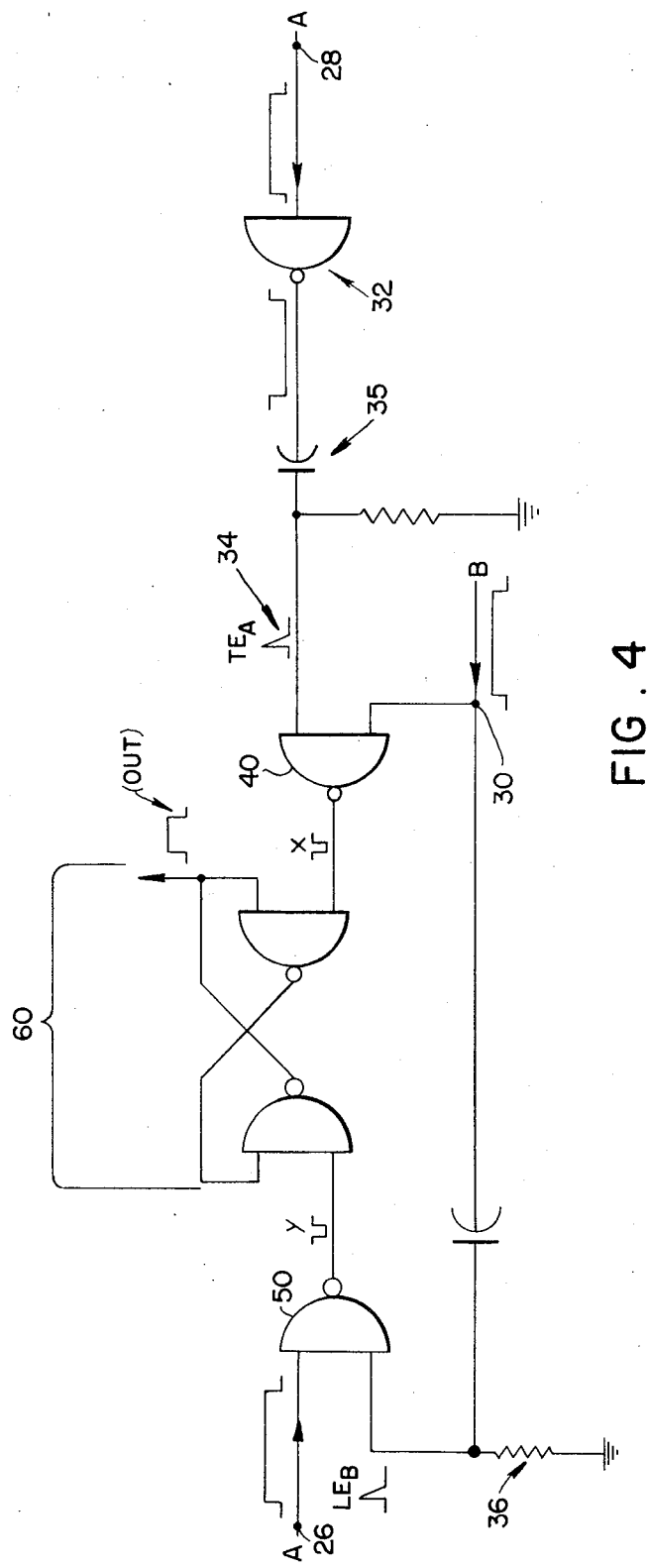
FIG. 4 is a schematic representation of the electronic circuit which will produce an output (OUT) pulse whenever the condition shown in FIG. 1 is obtained, but will fail to produce such a pulse when the condition shown in FIG. 2 is present.

Referring now more particularly to FIG. 4 these photocell signals, collectively indicated as A and B in FIG. 3 are adapted to be fed to this circuitry at the terminals shown at 26, 28 and 30. The photocell output A is fed to the terminals indicated at 26 and 28, and the photocell output B to the terminal indicated at 30 in FIG. 4.

Considering first the introduction of photocell output signal A at terminal 28, this output is inverted by convenient means such as a NAND gate 32, and the NAND gate 32 will be referred to herein as a first signal inverting means. The output of said first signal inverting means 32 is differentiated by a conventional capacitor and resistor configuration 35 to provide a signal 34, which signal will be referred to herein by the symbol $TE_A$. The said signal or pulse $TE_A$ is coincident in time with the trailing edge of the first photocell output 14 as inverted by the means 32. The time relationship of this pulse $TE_A$ is indicated schematically in FIG. 3.

The photocell output signal B is provided at terminal 30 as mentioned, and this signal is also differentiated by second differentiating means 36 of the same form as the means 35, that is as a result of a capacitor and resistance as indicated. The said second differientiating means 36 produces a pulse $LE_B$ coincident in time with the leading edge of the photocell output 20.

First and second NAND gates 40 and 50 are arranged as shown in FIG. 4 so as to receive the differentiated trailing edge signal $TE_A$ together with the photocell output signal B and to receive the photocell output signal from A together with the pulse $LE_B$ respectively. The first NAND gate 40 will thus provide a binary pulse X as indicated schematically in FIG. 3 corresponding to the trailing edge signal A whereas the second NAND gate 50 will provide a binary pulse Y, also indicated schematically in FIG. 3 corresponding to the leading edge of photocell B's output signal. These binary pulses, X and Y, are then fed to gate means 60, which gate means comprises a pair of NAND gates, referred to herein as third and fourth NAND gates, which NAND gates are adapted to receive, as inputs, the binary pulses, X and Y respectively, and also to receive as additional inputs the outputs of one another to provide an (OUT) signal whenever the photocell outputs A and B bear a predetermined time phase relationship to one another. FIG. 3 best illustrates the fact that such a signal (OUT) is produced only in the FIG. 1 condition, and more particularly, that no such (OUT) signal is produced in the FIG. 2 condition.

I claim:

1. First and second electromechanical transducers capable of producing first and second output signals which are similar to one another in response to similar mechanical conditions, said transducers being spaced longitudinally with respect to one another for sequential activation in response to a single mechanical condition to which each transducer is sequentially subjected, electric circuit means for accepting sequential output signals and for generating an output pulse when said sequential output signals bear a predetermined time phase relationship to one another, said electric circuit means comprising signal inverting means for said first output signal, first differentiating means for producing a pulse ($TE_A$) coincident with the trailing edge of said first output signal as inverted, a first NAND gate for producing a binary pulse (X) when said pulse ($TE_A$) and said second output pulse both occur, second differentiating means for producing a pulse ($LE_B$) coincident with the leading edge of said second output signal, a second NAND gate for producing a binary pulse (Y) when said pulse ($LE_B$) and said first output pulse both occur, and gate means for generating an OUT signal only when said binary pulse (Y) occurs before said binary pulse (X).

2. The combination recited in claim 1 wherein said gate means for generating said OUT signal comprises third and fourth NAND gates each of which receives as inputs each of said binary pulses X and Y respectively, and each of which NAND gates also receive as additional inputs the outputs of one another.

3. First and second electromechanical transducers capable of producing first and second output signals which are similar to one another in response to the longitudinal movement of an object past these transducers in sequence, said transducers being longitudinally spaced less than the minimum girth of the objects to be detected, logic circuit means for accepting the sequential output signals and producing pulses coincident with the leading edge of said second output signal and the trailing edge of said first output signal, said logic circuit further including flip flop means which is set by said leading edge pulse and reset by said trailing edge pulse whereby an output pulse (OUT) is generated each time that an object passes said transducers regardless of the spacing between successive objects passing said transducers.

* * * * *